United States Patent [19]
Smith et al.

[11] 3,810,600
[45] May 14, 1974

[54] AN EDGE MOLD HAVING EPOXY RESIN WALLS

[75] Inventors: Gary E. Smith; John G. Bailey, Jr., both of Collinsville, Va.

[73] Assignee: Chem Dynamics, Inc., Martinsville, Va.

[22] Filed: Dec. 1, 1972

[21] Appl. No.: 311,135

[52] U.S. Cl. .................. 249/95, 249/134, 264/275
[51] Int. Cl. .............................................. B29c 1/02
[58] Field of Search ........ 249/83, 95, 134; 264/274, 264/275, 337

[56] References Cited
UNITED STATES PATENTS

| | | |
|---|---|---|
| 3,059,278 | 10/1962 | Daniel .......................... 264/274 X |
| 3,108,327 | 10/1963 | Phillips et al. ........................ 249/83 |
| 3,124,092 | 3/1964 | Raynes ........................ 264/337 UX |
| 3,272,900 | 9/1966 | Ryan et al. .......................... 264/135 |
| 3,393,107 | 7/1968 | Wilburn .......................... 264/162 X |
| 3,601,857 | 8/1971 | Hampel .......................... 249/134 X |

Primary Examiner—R. Spencer Annear
Attorney, Agent, or Firm—Clelle W. Upchurch

[57] ABSTRACT

A mold provided for forming a shaped integral resinous edge about a wood panel has epoxy resin walls about a cavity conforming to the size and configuration of a pattern having a shaped edge, said mold being adapted to support in the cavity a panel without the shaped edge with a gap thereabout corresponding to the shaped edge of the pattern.

5 Claims, 8 Drawing Figures

PATENTED MAY 14 1974    3,810,600

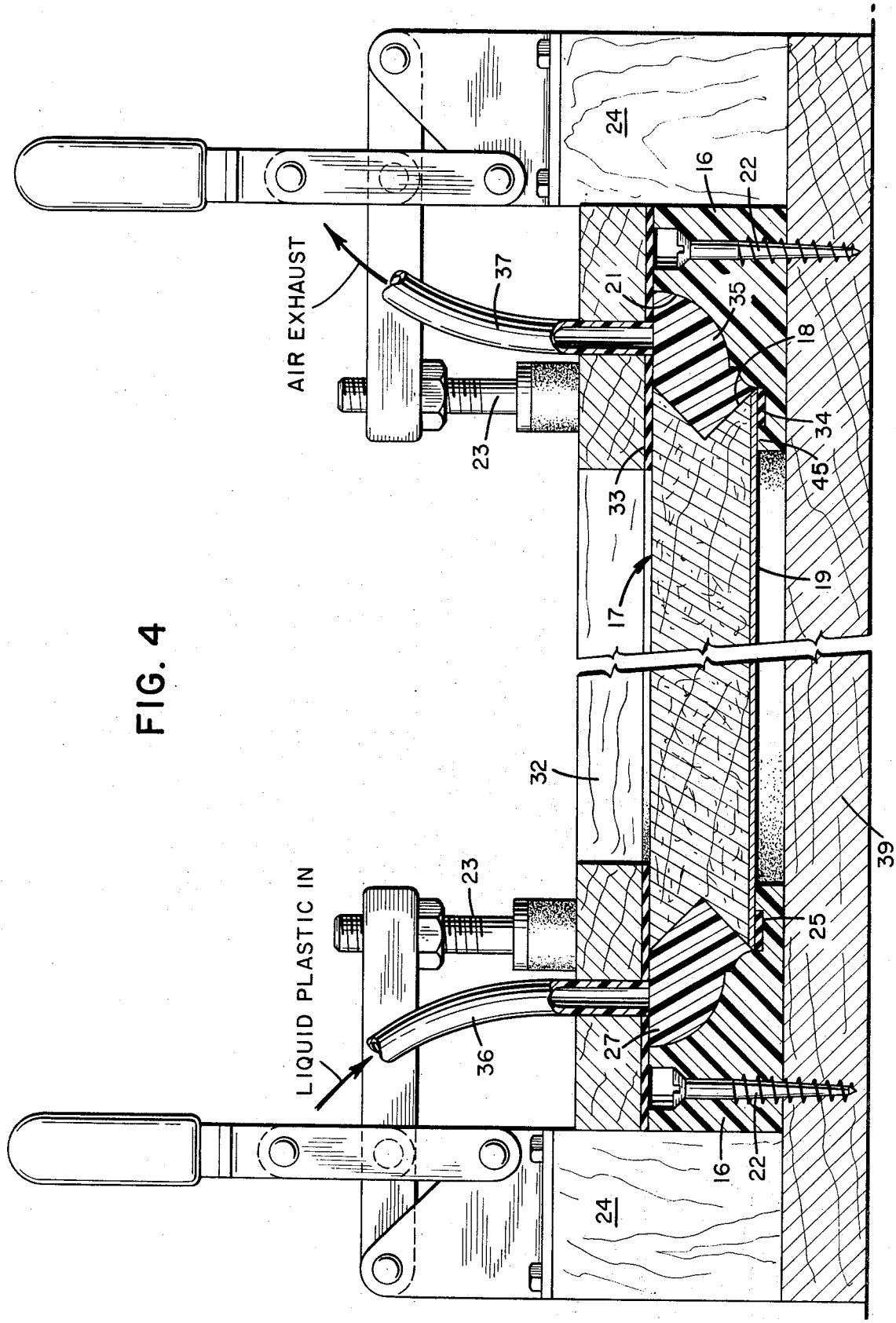

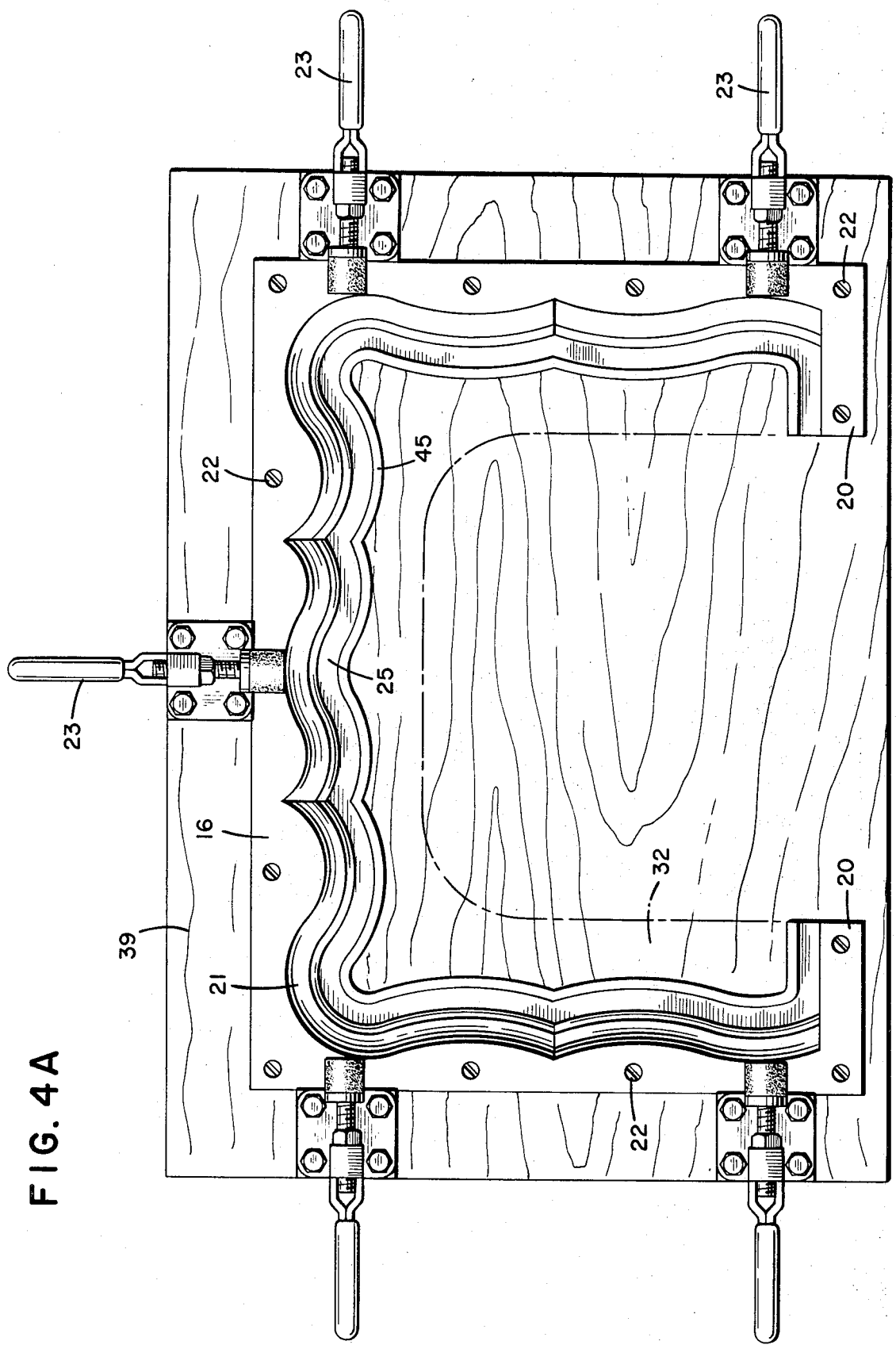

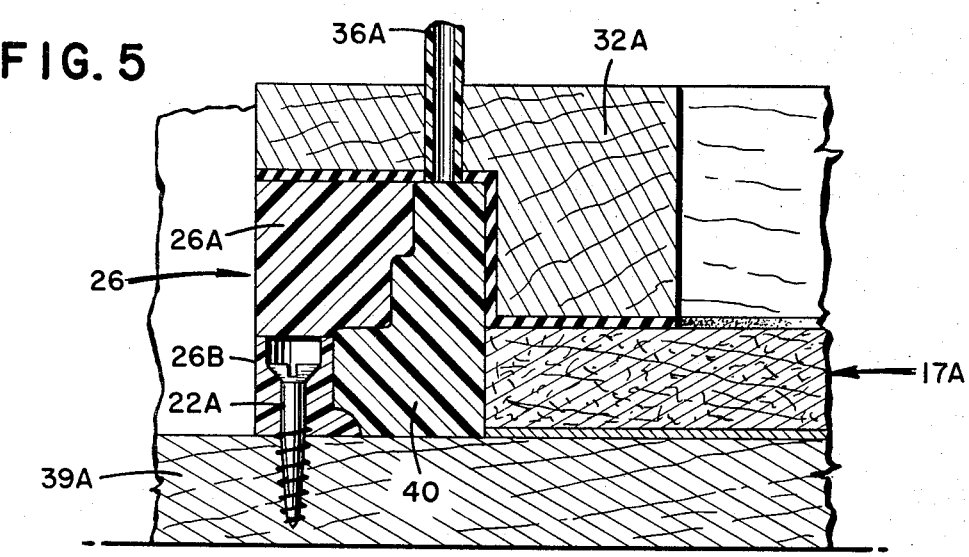
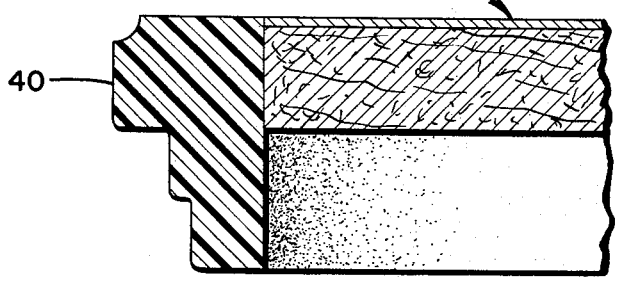
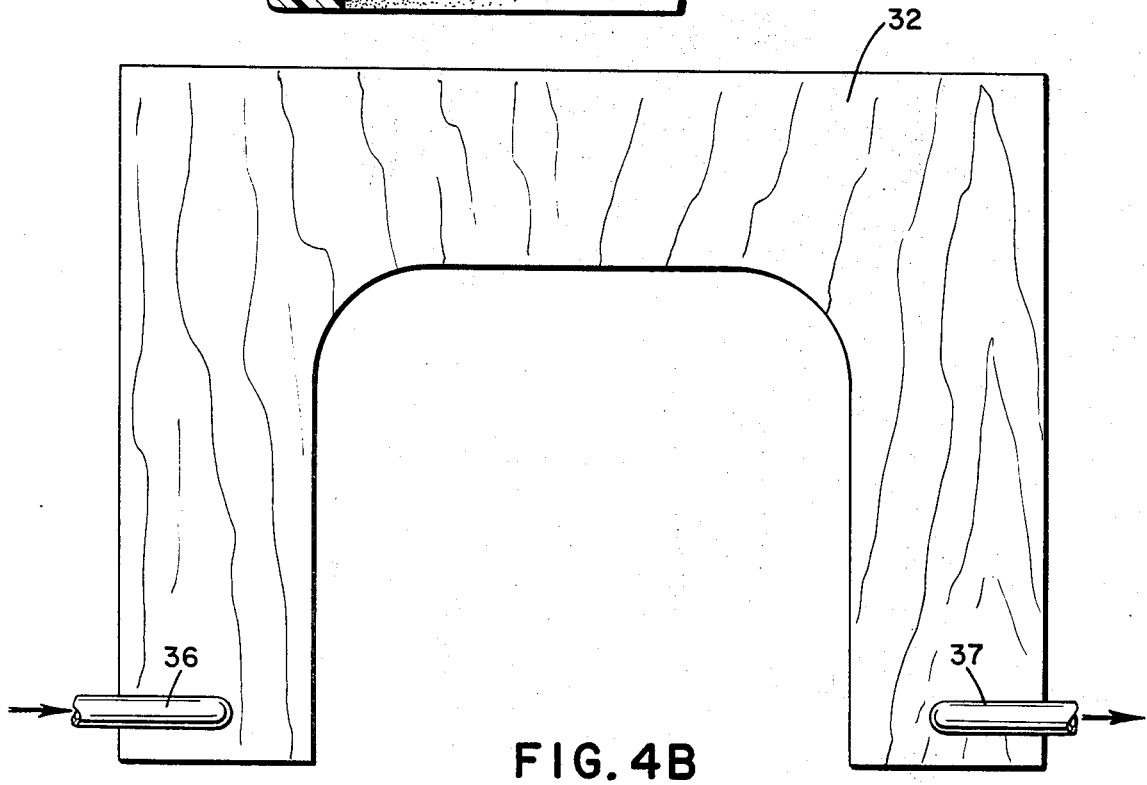

AN EDGE MOLD HAVING EPOXY RESIN WALLS

This invention relates generally to plastic molding and more particularly to an improved mold for use in reproducing wood patterns in plastic.

It has been proposed heretofore to mold plastic panels, overlays and edges on wood panels used in making furniture. For example, one process for molding an epoxy resin, polyurethane or polyester edge on a table top is disclosed in U.S. Pat. No. 3,393,107. Processes for molding an integral polyester edge on a plywood or furniture panel are disclosed in "Furniture Methods and Materials," Apr., 1969, and "Furniture Production," Apr., 1969, magazines, and in Italian Pat. No. 801,003, dated Jan. 15, 1968. Such processes involve first casting a flexible silicone rubber mold about a carved wood master or pattern having a shaped edge. A blank without the shaped edge is then positioned in the mold with a gap between the edge thereof and the mold wall corresponding in dimensions and shape to the edge of the pattern. A polymerizable polyester is charged to the open gap and solidified into a plastic edge resembling the edge of the master. The flexible silicone rubber molds, however, have the disadvantage that the mold life is relatively short and the molds wear rapidly with loss of detail of the pattern such as the grain structure of the wood. Moreover, the flexible silicone rubber molds permit polyester to flow over the surface of the blank adjacent its gap. This plastic overflow must be removed by sanding. Further disadvantages of the flexible silicone rubber mold are poor dimensional stability, shrinkage of the mold from its cast dimensions, swelling of the mold because of absorption of styrene from the resin cast therein and distortion of the mold under compression by the lid used to close it.

It is an object of this invention to provide an improved mold for molding plastic or resinous articles of furniture or parts thereof. Another object of the invention is to provide an improved process for molding articles of furniture or parts thereof. A further object of the invention is to provide an improved mold and a process for molding an integral plastic edge about a wood panel to be used as a table top, a door panel or other part of an article of household furniture. A more specific object of the invention is to provide a mold for forming plastic integral edges about a wood panel which more accurately reproduces the grain structure and dimensions of the pattern, has a longer useful life than a silicone rubber mold, and does not permit plastic to flow over the surface of the wood panel adjacent the mold cavity.

Other objects will become apparent from the following description with reference to the drawing wherein:

FIG. 4 is a fragmentary section through an embodiment of the mold provided by the invention with the blank of FIG. 3 positioned therein and an integral plastic edge molded thereabout;

FIG. 4A is a plan view of the mold of FIG. 4;

FIG. 4B is a plan view of an embodiment of the lid used to close the cavity of the mold illustrated in FIG. 4;

FIG. 5 is a fragmentary section of a second embodiment of a mold and a blank with an integral edge molded thereabout; and FIG. 6 is a fragmentary section of the product removed from the mold illustrated in FIG. 5.

The foregoing objects and others are accomplished in accordance with this invention, generally speaking, by providing a rigid epoxy resin mold and a process for molding a polyester resin or other thermosetting resinous shaped edge on a panel or the like in the epoxy resin mold. In a preferred embodiment of the invention, a rigid epoxy resin mold is cast about a suitable wood pattern having a shaped edge, a wood or other blank which is to be provided with a shaped synthetic resinous integral edge is positioned in the mold with a gap or cavity for the resin which corresponds to the shaped edge, the mold is closed to provide an enclosed cavity of the configuration desired for the resinous shaped edge, a liquid mixture containing a polymerizable thermosetting resinous composition is charged into the enclosed cavity, the resinous composition is cured to form a cast thermoset resinous edge on the blank and the resulting product is removed from the mold. It has been found that, unlike the heretofore available flexible silicone rubber mold, the rigid epoxy resin mold does not move away from the blank's surface under the pump pressure used to charge resin composition to the mold cavity so there is no leakage of resin from the cavity around the surrounding surface of the blank. Hence, sanding of resin overflow around the edge of the finished article is not required.

It has been found that the rigid epoxy resin mold is dimensionally stable. It does not shrink from its cast configuration and dimensions. It does not swell from exposure to castable resins and it does not expand because of exposure to the hot resins poured therein. Moreover, the mold does not distort when the lid is pressed against it to seal the mold cavity. Consequently, it is possible to provide shaped edges on table leaves and the like which are cast to close tolerances and will abut each other accurately.

Figure 1:
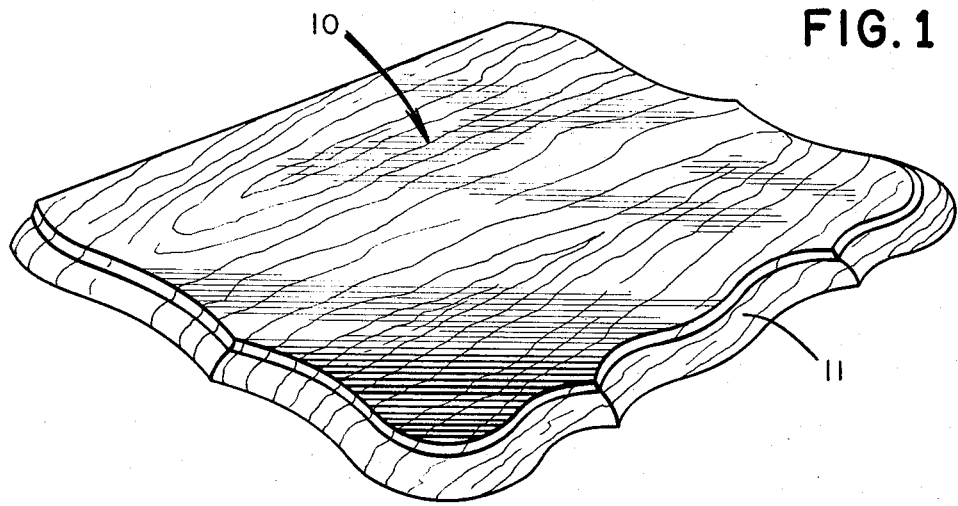
FIG. 1 is a perspective view of a wood master or pattern to be used to make an embodiment of the mold provided by this invention.

Referring now to the drawing, a wood panel 10 having a decorative step-wise curved shaped edge around three sides thereof is illustrated in FIG. 1. The edge 11 on this panel has been carved by a skilled craftsman. The surface of the panel is finished by sanding and other conventional woodworking processes. Panel 10 may be, for example, a pattern or master for a table top.

Figure 2:
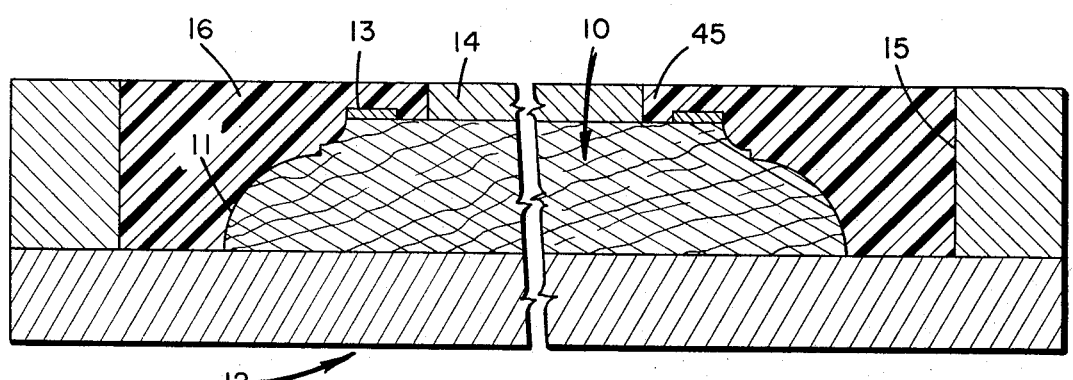
FIG. 2 is a fragmentary section of a mold showing the pattern of FIG. 1 positioned therein and a plastic mold formed about the pattern.

As illustrated in FIG. 2, panel 10 is positioned in a suitable pan-shaped mold 12. A coating of a suitable mold release agent such as a silicone oil is applied to the inner surface of pan 12 and a similar coating is applied to the surface of panel 10 before panel 10 is positioned as shown in FIG. 2. A suitable wood, metal or plastic strip 13 may be placed on the top surface of panel 10 along edge 11. A suitable rectangular panel or frame 14 of wood, metal, plastic, or the like, is positioned on the top of panel 10 with its outer edge spaced slightly inwardly from strip 13.

A suitable liquid epoxy resin adapted to solidify into a rigid thermosetting product is pumped or otherwise charged to the gap or mold cavity 15 defined between pan 12, panel 10, strip 13 and frame 14. A sufficient volume of the polymerizable epoxy resin is poured into mold cavity 15 to cover strip 13 and to form an inwardly projecting integral rim or flange 45. The pan 12 and its contents are stored at room temperature until the epoxy resin solidifies. Then pattern 10 is removed and the resulting mold 16 having a cavity 21 conforming to the configuration of edge 11 of panel 10 (FIG. 4A) is heated at 200°F. to 350°F. for one to six hours to cure the epoxy resin.

Figure 3:
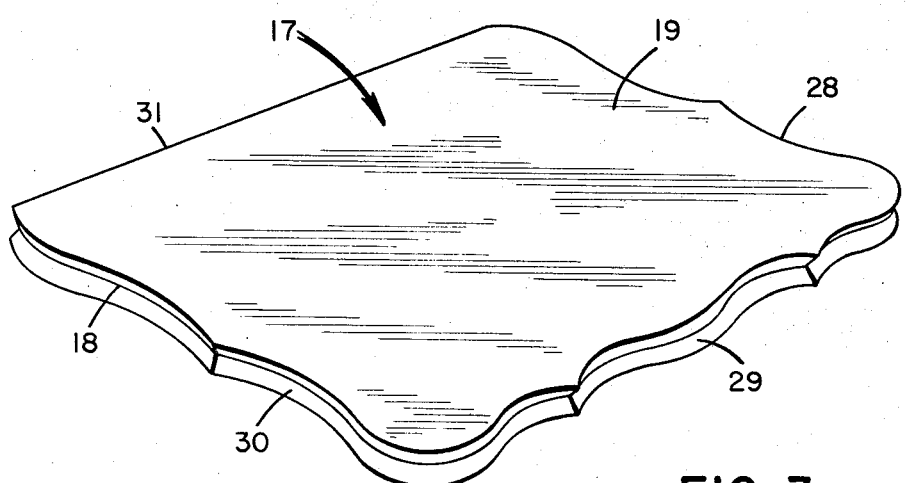
FIG. 3 is a perspective view of a wood blank to be provided with an integral molded plastic edge thereabout.

A suitable wood panel blank 17 (FIG. 3) with an upper surface 19 is prepared by conventional woodworking techniques. The dimensions and configuration of blank 17 correspond to those of the body of panel 10, but the blank does not have an edge corresponding to edge 11. The edge of panel 17 may be cut with a router to provide a rabbet edge 18 as illustrated in FIGS. 3 and 4.

The rigid epoxy resin mold 16 may be fastened by spaced screws 22 to a base plate 39 of wood, plastic or the like (FIG. 4). A plurality of clamps 23 mounted on a suitable base 24 are provided at spaced points about mold 16. Blank 17 is positioned in cavity 21 of mold 16 with a gap 27 between its three edges 28, 29, and 30 (FIG. 3), and the inner wall of mold 16. The straight edge 31 of blank 17 fits snugly against the adjacent wall of mold 16 and the bottom surface of blank 17 rests on a gasket 34 in groove 25 to seal the end of the mold cavity 21 adjacent the corners formed by the juncture of edges 28 and 30 and by the juncture of edges 29 and 30 against plastic flow out of the cavity 21. Because the epoxy resin walls of mold 16 are rigid, it is only necessary for the rim 45 and back wall 20 to extend a short distance from each side under edge 31 of panel 17.

An open U-shaped lid or top 32 (FIGS. 4 and 4B) has a flexible polyurethane elastomer gasket 33 adhered to its underside. Gasket 33 bridges cavity 21 and forms a seal with the exposed surface of panel 17 and with the top surface of mold 16. As illustrated in FIG. 4, a flexible silicone rubber gasket 34 is disposed in the groove 25 in rim 45.

With blank 17 and top 32 disposed in closed mold 16 as illustrated in FIG. 4, clamps 23 are moved to the position shown to force top 32 against the exposed lower surface of blank 17. The surface 19 of blank 17 is pressed against gasket 34, back edge 31 fits snugly against the wall of tab 20, and gasket 33 is pressed against the top edge of mold 16 and against the bottom of panel 17 to seal cavity 21.

To mold an integral edge 35 of plastic about edges 28, 29, and 30 of blank 17, a liquid polymerizable composition is pumped through conduit 36 until cavity 21, including the rabbet 18, is filled therewith. Air from cavity 21 escapes through conduit 37 and the cavity 21 fills with liquid.

The liquid polymerizable polyester composition filling mold cavity 21 will solidify at room temperature in about 5 minutes. The product which is a replica of master 10 may then be removed from cavity 21 of mold 16. Since the liquid composition charged to cavity 21 does not flow between surface 19 of blank 17 and tab 20, a solid plastic flash is not formed on surface 19. Hence, sanding is not required to remove plastic from surface 19.

It has been found that it is not always necessary to form a groove 25 in rim 45 to seal cavity 21 and to prevent the formation of a plastic flash on surface 19. If the surface of rigid rim 45 is substantially smooth, the surface 19 of blank 17 can be pressed against it to form a seal against plastic flow therebetween. For example, a gasket similar to 34 is not used in the embodiment of FIG. 5. Likewise, rabbet 18 may not be required.

In the embodiment illustrated in FIG. 5, a molded plastic edge 40 may extend above blank 17A, as shown in split mold 26 in FIG. 5, to provide an edge 40 which extends beyond one of the surfaces of blank 17A. After solidifying of the polymerizable resin, the product may be removed from mold 26 by lifting top 32A from the top edge of mold 26 and the surface of blank 17A, and thereafter lifting the upper part 26A of mold 26 from the base 26B. The product will have an integral shaped plastic depending edge 40 around three edges of blank 17A as shown in FIG. 6.

Any suitable liquid epoxy resin which will solidify into a rigid thermoset resinous mold may be poured into the cavity of mold 12 to form the walls of mold 16. Suitable epoxy resins are available commercially. Examples of suitable epoxy resins are disclosed in "Encyclopedia of Polymer Science and Technology," Volume 6, pp. 209–271, published by John Wiley & Sons, Inc., 1967, the disclosure of which is incorporated herein by reference. One liquid epoxy resin which has been found especially advantageous for making mold 16 is disclosed and claimed in an application filed by Gary E. Smith entitled "Mold" on the same day as this application, Ser. No. 311,136, commonly owned with this application. This liquid has the following composition:

| Part A | Parts by Weight |
| --- | --- |
| Diglycidyl ether of Bisphenol A | 100 |
| Antifoam compound (Dow Corning Antifoam "A") | 0 – 1 |
| Wetting Agent (Nuosperse 657) | 0 – 5 |
| Vinyl cyclohexane dioxide | 0 – 50 |
| Calcium carbonate | 0 – 300 |
| Sponge Iron | 0 – 700 |
| Alkoxy silicone | 0 – 5 |
| Aliphatic naphtha | 0 – 50 |
| Part B | Parts by Weight |
| Methylene dianiline | 40 – 60 |
| Meta-phenylene diamine | 60 – 40 |
| Biphenol A | 0 – 2.5 |
| Propylene oxide | 0 – 40 |
| Diethylene triamine | 0 – 25 |
| Adduct of diglyidyl ether and DTA with Bisphenol A | 0 – 200 |

The alkoxy silicone and a solvent therefor wuch as naphtha are included in the composition to prevent shrinkage of the replica during curing of the epoxy resin. Suitable alkoxy silicones include the alkoxy silanes disclosed in the "Encyclopedia of Polymer Science and Technology", Vol. 12, pages 481–484, published by Interscience Publishers, Copyright 1970. Examples of such compounds are trimethylmethoxy silane, dimethyl dimethoxy silane and the like.

The liquid charged to mold 16 may be prepared by mixing 100 parts of Part A with 6 parts Part B.

Mold 16 may, of course, by used in molding any suitable synthetic resin or plastic edge about a wood panel, such as, for example, unsaturated polyesters, epoxy resins, polystyrene. An example of a preferred polyester composition is:

| | Parts by Weight |
| --- | --- |
| Unsaturated polyester prepared by esterifying maleic acid, | |

| | |
|---|---|
| phthalic acid and propylene glycol dissolved in 30% by weight styrene | 100 |
| Styrene monomer | 30 |
| Pecan flour | 80 |
| Titanium dioxide | 1 |
| Chopped glass | 1.5 |
| Methyl ethyl ketone peroxide | 1 – 2 |
| Cobalt naphthenate | 0.2 |
| Dimethyl aniline | 0.1 |

The above composition cures at room temperature and is preferred, but the ethylenically unsaturated polyester may be prepared by reacting any suitable polyhydric alcohol or phenol such as, for example, ethylene glycol, propylene glycol, diethylene glycol, butylene glycol, glycerine, trimethylol propane, 1,4-butane diol, Bisphenol A, or the like, with any suitable dicarboxylic acid or anhydride thereof, preferably one having three to eight carbon atoms, such as, for example, maleic acid, malic acid, fumaric acid, itaconic acid, adipic acid, phthalic acid, isophthalic acid, terephthalic acid, mixtures thereof, or the like, providing that at least one of the polyhydric alcohols or dicarboxylic acids is unsaturated. If a polyhydric alcohol or phenol having more than two reactive hydrogen atoms is used, it must be used in a relatively small percentage of the total polyhydric alcohol. Suitable polyesters are disclosed in Volume 11, pp. 129–168, of the aforesaid encyclopedia.

An ethylenically unsaturated monomer is included in the formulation with the polyester used to form the integral edge. This monomer may be, for example, styrene, vinyl toluene, p-methyl styrene, methyl methacrylate, acrylates, dialkyl phthalate and the like. One suitable commercially available polyester resin is Laminac EPX 215–1 sold by American Cyanamid. This resin is a mixture of an ethylenically unsaturated polyester and styrene. The polyester resin may contain from 20 percent to 50 percent monomer and 80 percent to 20 percent ethylenically unsaturated polyester.

The polyester and monomer mixture may contain any suitable inert filler such as, for example, calcium carbonate, shell flour, talc, quartz, or the like. Such a filler is dispersed in the polyester mixture before it is poured in the mold cavity. The filler should have a relative small particle size of say 20 mesh or smaller.

Gaskets 33 and 34 may be strips of any suitable resilient material such as rubber, epoxy resin, silicone rubber, synthetic elastomer or the like.

Although the invention has been described in detail for the purpose of illustration, it is to be understood that such detail is solely for that purpose and that variations can be made therein by those skilled in the art without departing from the spirit and scope of the invention except as it may be limited by the claims.

The embodiments of the invention in which an exclusive property or privilege is claimed are defined as follows:

1. A mold for forming a shaped integral resinous edge about a wood panel or the like which comprises a rigid epoxy resin wall about a cavity having the dimensions and configuration of a pattern having a body and a shaped edge, said wall having an integral epoxy resin rim which extends inwardly under the cavity a distance greater than the width of the shaped edge of the pattern, said rim being adapted to support a member positioned in the mold with a gap between its edges and the mold wall conforming to the dimensions and configuration of the shaped edge, a top adapted to be pressed against the mold wall and said member while bridging said gap, means for pressing said top into sealing engagement with the mold wall and the said member and for pressing the said member against said rim to seal the resulting enclosed cavity against liquid flow from the cavity and over said member, and means for filling the enclosed cavity with a solidifiable liquid resin.

2. The mold of claim 1 wherein the said wall has a surface about the cavity adapted to produce a wood grain surface on the resulting molded edge.

3. The mold of claim 1 having a split wall about a cavity adapted to form a shaped edge with an undercut portion.

4. The mold of claim 1 wherein said rim has a groove therein and a resilient gasket in the groove.

5. The mold of claim 4 wherein the back wall of the mold terminates just beyond the edge of the said member.

* * * * *